(12) United States Patent
Damgaard et al.

(10) Patent No.: US 10,900,515 B2
(45) Date of Patent: Jan. 26, 2021

(54) YAW BEARING ARRANGEMENT

(71) Applicant: Siemens Gamesa Renewable Energy A/S, Brande (DK)

(72) Inventors: Steen Damgaard, Herning (DK); Rune Nielsen, Ikast (DK)

(73) Assignee: SIEMENS GAMESA RENEWABLE ENERGY A/S

(*) Notice: Subject to any disclaimer, the term of this patent is extended or adjusted under 35 U.S.C. 154(b) by 0 days.

(21) Appl. No.: 16/454,782

(22) Filed: Jun. 27, 2019

(65) Prior Publication Data
US 2020/0011304 A1 Jan. 9, 2020

(30) Foreign Application Priority Data
Jul. 9, 2018 (EP) .................................... 18182501

(51) Int. Cl.
*F16C 23/02* (2006.01)
*F16C 25/02* (2006.01)
(Continued)

(52) U.S. Cl.
CPC .............. *F16C 23/02* (2013.01); *F03D 80/70* (2016.05); *F16C 17/107* (2013.01); *F16C 25/02* (2013.01);
(Continued)

(58) Field of Classification Search
CPC ........ F16C 17/04; F16C 17/10; F16C 17/107; F16C 17/26; F16C 23/02; F16C 25/02;
(Continued)

(56) References Cited

U.S. PATENT DOCUMENTS

| 89,721 A | * | 5/1869 | Williams | |
| 2,448,341 A | * | 8/1948 | Yeomans | B23Q 1/70 384/264 |

(Continued)

FOREIGN PATENT DOCUMENTS

| CN | 201225232 Y | 4/2009 |
| CN | 102825420 A | 12/2012 |

(Continued)

OTHER PUBLICATIONS

European Search Report dated Jan. 14, 2019 for Application No. 18182501.9.

(Continued)

*Primary Examiner* — James Pilkington
(74) *Attorney, Agent, or Firm* — Schmeiser, Olsen & Watts LLP

(57) ABSTRACT

A yaw bearing arrangement for a wind turbine, including a yaw bearing with a yaw ring and radial adjustment acting on the inner radial lateral surface of the yaw ring, the radial adjustment including at least a housing, at least one sliding pad and one or more threaded adjustment bolts arranged in threaded housing bores and connected with the sliding pad for a radial adjustment of the sliding pad towards the lateral surface and axial bores for accommodating fixation bolts, wherein the housing is a ring or a ring segment with a plurality of radial, at least partially threaded bores, each radial bore accommodating a radial sliding unit including a radial sliding pad and a threaded radial adjustment bolt for radial movement of the sliding pad.

14 Claims, 5 Drawing Sheets

(51) Int. Cl.
*F16C 17/10* (2006.01)
*F03D 80/70* (2016.01)

(52) U.S. Cl.
CPC ....... *F05B 2240/50* (2013.01); *F16C 2360/31* (2013.01)

(58) Field of Classification Search
CPC ... F16C 2360/31; F05D 2240/50; F03D 80/70
See application file for complete search history.

(56) References Cited

U.S. PATENT DOCUMENTS

| | | |
|---|---|---|
| 2010/0176601 A1 | 7/2010 | Pechlivanoglou et al. |
| 2011/0233939 A1* | 9/2011 | Noda ............... F16C 25/06 290/55 |
| 2012/0224799 A1 | 9/2012 | Wagner |
| 2015/0047270 A1 | 2/2015 | Gotfredsen |
| 2019/0113026 A1 | 4/2019 | Sorensen |

FOREIGN PATENT DOCUMENTS

| | | |
|---|---|---|
| CN | 104373288 A | 2/2015 |
| CN | 205936990 U | 2/2017 |
| DE | 102005016156 * | 10/2006 |
| WO | 20080077983 A1 | 7/2008 |
| WO | WO 2017162250 A1 | 9/2017 |

OTHER PUBLICATIONS

Non-English Chinese Office Action dated Oct. 10, 2020 for Application No. 201910614860.7.

* cited by examiner

YAW BEARING ARRANGEMENT

CROSS-REFERENCE TO RELATED APPLICATION

This application claims priority to European Application No. 18182501.9, having a filing date of Jul. 9, 2018, the entire contents of which are hereby incorporated by reference.

FIELD OF TECHNOLOGY

The following refers to a yaw bearing arrangement for a wind turbine, comprising a yaw bearing with a yaw ring and radial adjustment means and a radial adjustment acting on the inner radial lateral surface of the yaw ring, the radial adjustment means or radial adjustment comprising at least a housing, at least one sliding pad and one or more threaded adjustment bolts arranged in threaded housing bores and connected with the sliding pad for a radial adjustment of the sliding pad towards the lateral surface, and axial bores for accommodating fixation bolts.

BACKGROUND

Such a yaw bearing arrangement is usually used for bearing the nacelle on the tower allowing a rotation of the nacelle. The yaw bearing arrangement comprises a yaw ring fixed to the tower, with the nacelle sliding on the yaw ring. For rotating the nacelle, the yaw ring comprises radial gear teeth, with one or more motors arranged at the nacelle are used comprising respective gearings meshing with the gearing of the yaw ring.

The yaw bearing respectively the yaw ring is a highly stressed structural component. It is necessary to precisely position the yaw ring. For positioning the yaw ring radial adjustment means or radial adjustment in the form of yaw clamps are used. Each yaw clamp comprises a housing, which is mounted with several bolts to a mounting part of the nacelle. Due to the high stress in the bolts and the yaw clamp the bolts fixing the clamp are positioned as close to the yaw ring as possible. The yaw clamp further comprises a sliding pad connected to the radial lateral surface of the yaw ring and one or more radial adjustment bolts connected to the sliding pad for radial moving the sliding pad towards the lateral surface of the yaw ring, thereby adjusting the radial position of the yaw ring. The sliding pad comprises a high strength steel plate, to which the one or more adjustment bolts are connected enabling the sliding pad to push the yaw ring for its radial adjustment. As the housing and the bolts are positioned as close as possible to the inner lateral surface of the yaw ring there is very little room left for integrating the sliding pad. This makes the design of the yaw clamp very compact, somehow fragile and especially complicates to perform maintenance work. As several of these yaw clamps are arranged around the inner circumference of the yaw ring known yaw bearing arrangements have multiple problem zones.

SUMMARY

An aspect relates to an improved yaw bearing arrangement.

According to embodiments of the invention a yaw bearing arrangement as depicted above is characterized in that the housing is a ring or a ring segment with a plurality of radial, at least partially threaded bores, each radial bore accommodating a radial sliding unit comprising a radial sliding pad and a threaded radial adjustment bolt for radial moving the sliding pad.

According to embodiments of the invention the radial adjustment means or radial adjustment is a ring-shaped means or a ring segment means (or a ring or ring segment) arranged close to the inner radial lateral surface of the yaw ring and fixed to a mounting part of the nacelle. The ring-shaped housing maybe a single ring or maybe a segmented ring built by several ring segments. The single ring or each ring segment respectively the single ring comprises axial and radial bores. The axial bores are used for accommodating respective fixation bolts for fixing the ring or ring segment to the mounting part of the nacelle. As the housing respectively, the adjustment means or adjustment is a circumferentially extending component it is possible to use a smaller number of fixation bolts for fixing it to the non-rotating part with the respective axial bores and the fixation bolts having a larger distance between each other compared to the distance at known yaw clamps. Furthermore, radial threaded bores are provided, each radial bore accommodating a sliding unit comprising a sliding pad and an adjustment bolt. As less fixation bolts are needed with a relatively large gap between them it is possible to enlarge the diameter of the radial and at least partially threaded bores. So, in each radial bore one single sliding unit comprising a sliding pad and an adjustment bolt is arranged allowing a simple change of the sliding pad when needed, as it is only necessary to remove the adjustment bolt and to change the sliding pad by pulling it out of the radial bore and inserting a new sliding pad into the bore and then fixing the adjustment bolt again. So, a very small and quick replacement is possible with a simple tool, as the adjustment bolt comprises a respective tool attachment part at its free end. Furthermore, the plurality of separate adjustment or sliding units, with each unit being separately adjusted, allows a very precise adjustment. With the plurality of fixation bolt the housing, be it a ring or only a ring segment, can also securely be fixed to the mounting part of the nacelle, while comprising the plurality of separate sliding or adjustment units.

As depicted above, extremely heavy loads are stressing the yaw bearing arrangement. For securely fixing and adjusting the yaw ring not only in a radial direction, but also in an axial direction it is possible that the ring or the ring segment also comprises a plurality of axial threaded bores, each bore accommodating an axial sliding unit comprising an axial sliding pad and a threaded axial adjustment bolt for axially moving the sliding pad. With this plurality of axial sliding units, the yaw ring is axially fixed in its position while rotating or being loaded. Also, for this axial positioning or adjustment a plurality of separate axial sliding units are arranged at the ring or ring segment, each comprising a sliding pad and an axial bolt for moving the sliding pad. With this plurality of adjustment or sliding units, which can also easily be changed when needed, a very precise adjustment and slide guiding is possible.

In a preferred embodiment each radial bore or each axial bore, or each radial and axial bore has a first threaded bore section having a first diameter and a second unthreaded bore section, having a smaller second diameter, accommodating the sliding pad. With this bore set up the sliding pad can easily be accommodated in the second unthreaded bore section, while the adjustment bolt can be screwed into the first threaded bore section. The diameter of the second unthreaded bore section is somehow smaller than the diameter of the threaded first bore section allowing an easy changing of the sliding pad if needed.

The radial bolt or the axial bolt or each bolt comprises a first threaded bolt section and a second unthreaded bolt section engaging into the second bore section. As the bolt engages into the second bore section it is securely connected to the sliding pad, which can be made quite short, as the bolt extends into the unthreaded second bore section.

A biasing means or biasing member or bias is provided for biasing the sliding pad towards the lateral surface. This biasing means or biasing member, which can also be referred as a damping means or damper, presses the sliding pad against the lateral surface of the yaw ring keeping a constant contact. This biasing or dampening means furthermore takes varying load resting on the yaw bearing arrangement at turbulent conditions with varying wind loads, so that these loads can somehow be absorbed.

The biasing means or biasing member can be a spring resting on the bolt and the sliding pad. It can also be realised as an elastic intermediate pad or ring arranged between the bolt and the sliding pad. In case a spring is used this spring can either be a disc spring, but it can also be arranged in a hollow spring compartment provided at a sliding pad.

The sliding pad can completely be made of a polymer material and therefore only perform a sliding action. It can also have the function of a lightning rod. If this function is preferred a sliding pad comprises a sliding part made of polymer material and a lightning part made of metal, with the lightning part being electrically connected to the bolt. This lightning part can be arranged within the ring-shaped sliding part. The lightning part connects the inner lateral surface of the yaw ring to the bolt and further to the housing, which is grounded.

Finally, it is preferable to provide a lubrication bore in the bolt and the sliding pad ending at the sliding surface of the sliding pad. This lubrication bore can be connected to a lubrication means so that a lubrication fluid can be pressed through the bore in the contact area of the sliding pad and the inner lateral surface of the yaw ring. In an alternative the lubrication bore allows a tubing to be mounted being connected to the sliding pad.

Aside the yaw bearing arrangement embodiments of the invention also relates to a wind turbine comprising at least one yaw bearing arrangement as depicted above.

BRIEF DESCRIPTION

Some of the embodiments will be described in detail, with references to the following Figures, wherein like designations denote like members, wherein.

DETAILED DESCRIPTION

Figure 1:
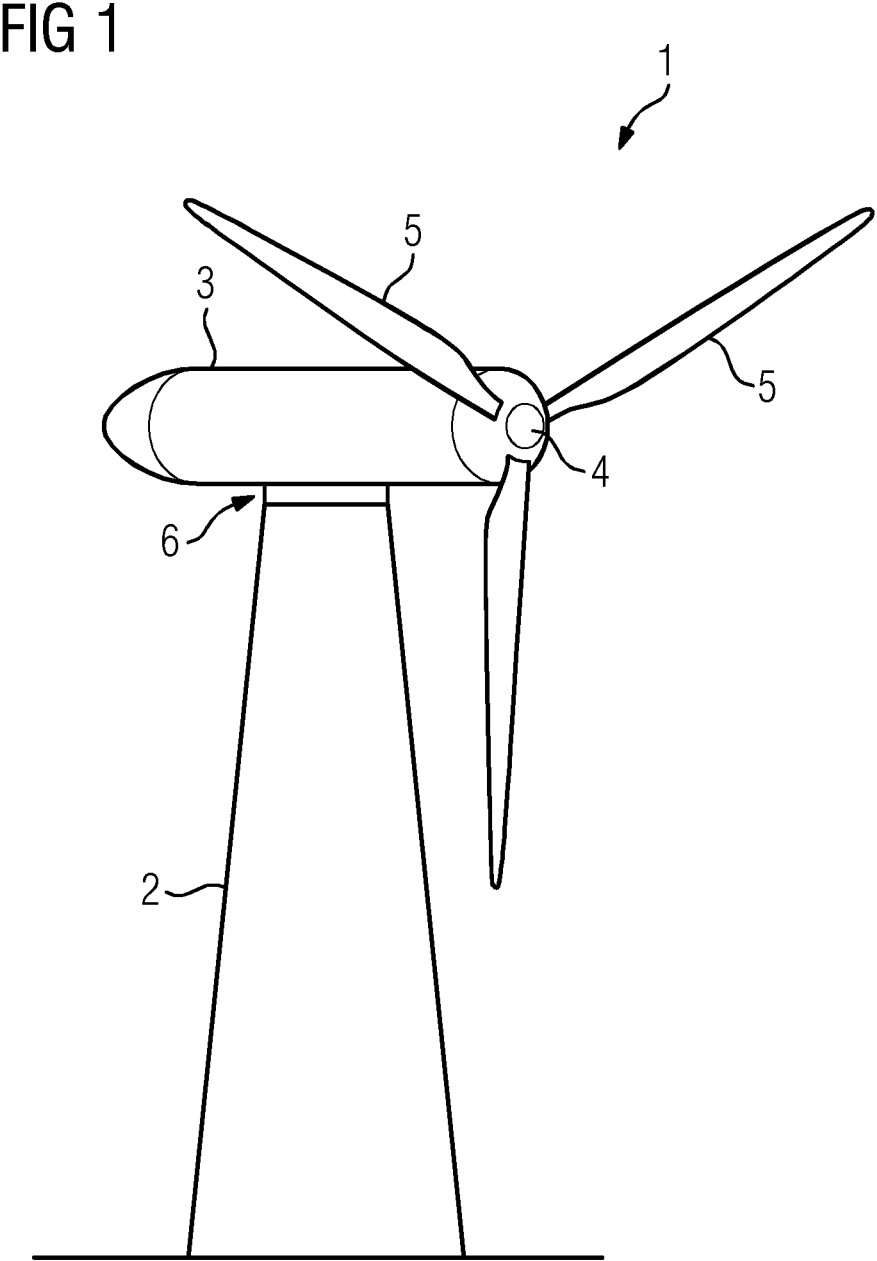
FIG. 1 shows a schematic drawing of a wind turbine.

FIG. 1 shows a principal view of a wind turbine 1 comprising a tower 2 and a nacelle 3 comprising a hub 4 with rotor blades 5. The nacelle 3 is rotatable relative to the tower 3 by means of a yaw bearing arrangement 6. For rotation purpose one or more motors are arranged at the nacelle 3 driving a pinion meshing with the gear of a yaw ring 7 fixed to the tower 2. As the drive is provided at the nacelle 3 the nacelle 3 can be rotated relative to the fixed yaw ring respectively the tower 2.

Figure 2:
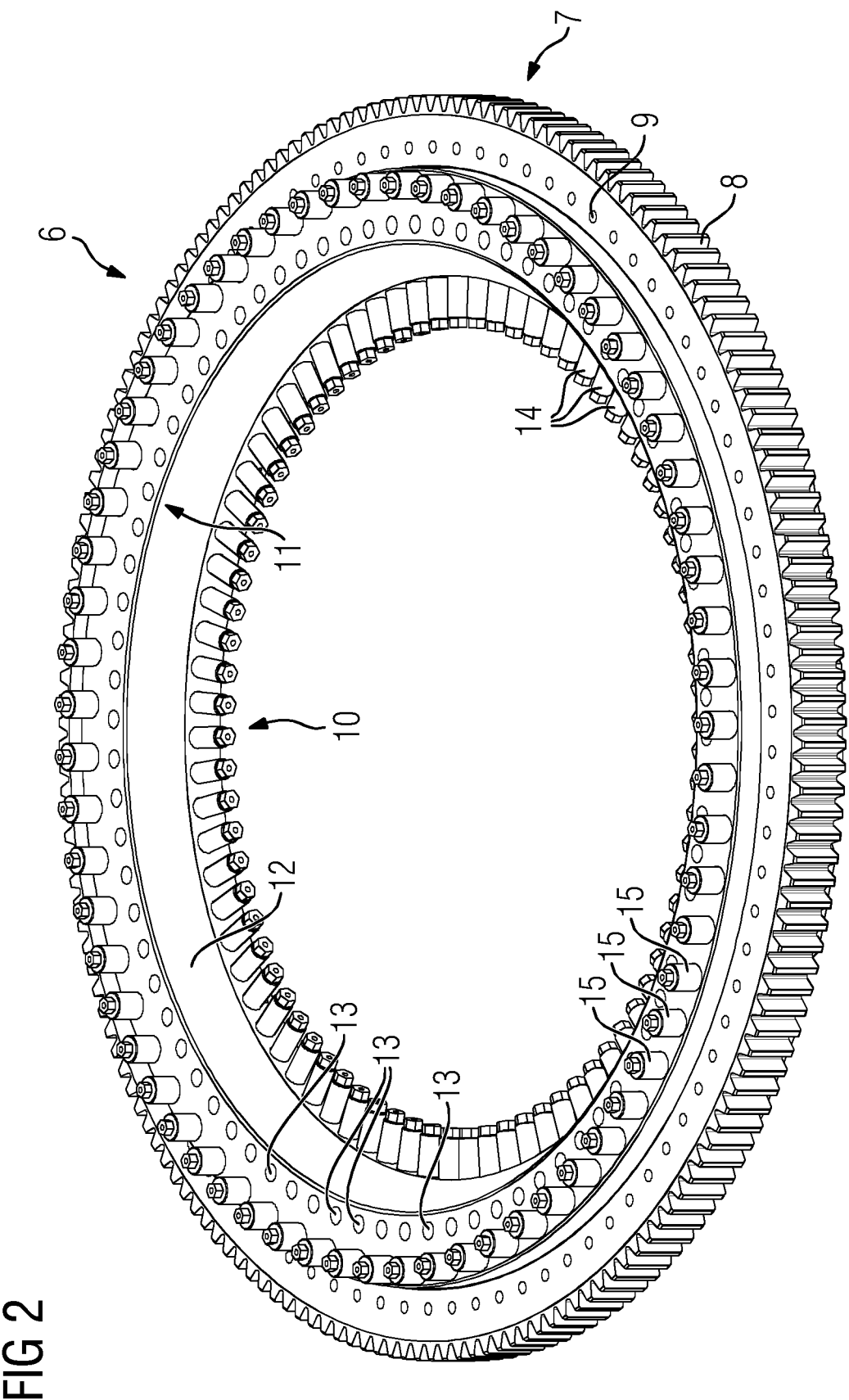
FIG. 2 shows a perspective view of an inventive yaw bearing arrangement.

FIG. 2 shows a perspective view of an inventive yaw bearing arrangement 6. This yaw bearing arrangement comprises a yaw ring 7 with a gear toothing 8 at its outer circumference. The yaw ring 7 is attached to the tower 2 by means of a plurality of bolts inserted into axial bores 9, which maybe threaded or unthreaded.

The inventive yaw bearing arrangement 6 further comprises radial adjustment means or radial adjustment 10 comprising a housing 11 in the form of a ring 12 being arrangement at the inner diameter of the yaw ring 7. The ring 12 maybe a one-piece ring, it may also be a segmented ring comprising several ring segments, which build the ring form. Instead of a ring 12 the attachment means may also comprise several ring segments extending partially around the inner circumference of the yaw ring 7 but being distanced to each other. For example, four or six or eight ring segments maybe distributed around the circumference, but are distanced with a certain gap to each other. Nevertheless, the basic inventive set up of either a ring or any of these ring segments is the same. While the ring segments or the ring 12 may be separate parts being attached to the nacelle 3 respectively a bedframe of the nacelle 3, the ring segments or the ring 12 can be in integral part of the bedframe of the nacelle, meaning that the segments or the ring 12 is directly casted to or machined out of the bedframe.

The adjustment means 10 includes the housing 11 in the form of the ring that includes a plurality of axial bores 13. The axial bores 13 may be threaded or unthreaded, and fixation bolts are inserted into the axial bores 13 for fixing the housing 11 to a fixation part provided at the nacelle 3, as the adjustment means 10 rotates with the nacelle 3.

Furthermore FIG. 2 shows a plurality of radial sliding units 14 being oriented in a horizontal direction, and a plurality of axial sliding units 15 being orientated in a vertical direction. These separate sliding units 14, 15 are distributed around the circumference of the ring 12 in relatively high number, as FIG. 2 shows. The radial sliding units 14 are used for radially adjusting and slide guiding the yaw ring 7, while the axial sliding units 15 are used for axially positioning and guiding the yaw ring 7.

The FIGS. 3-6 show various embodiments of the radial sliding units 14, but the same features and set up also apply to the axial sliding units 15.

Figure 3:
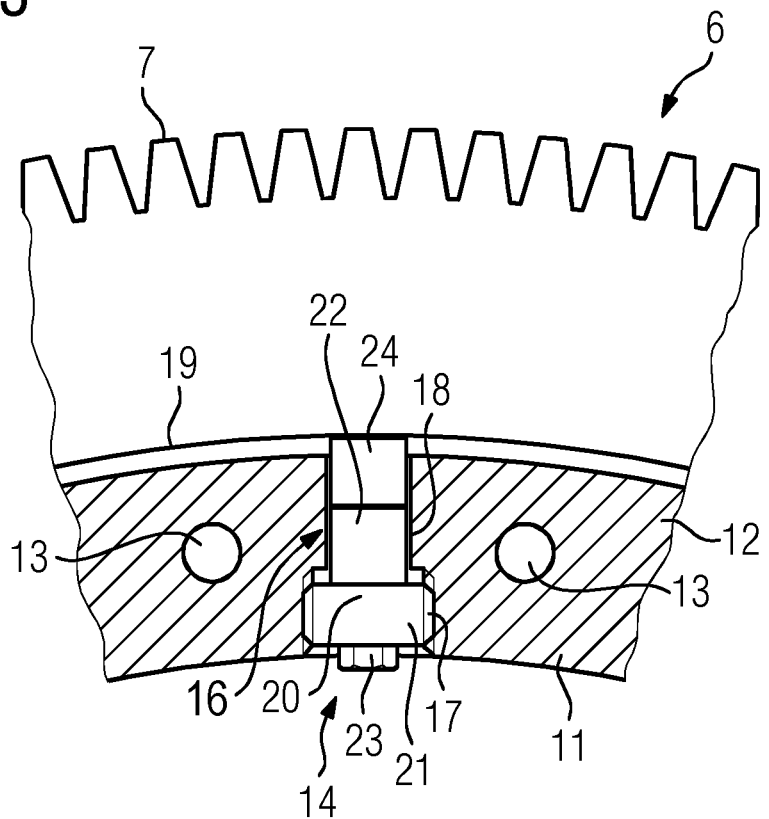
FIG. 3 shows a cross sectional view of a part of an inventive yaw bearing arrangement with a first adjustment unit.

FIG. 3 shows a cross sectional view of a part of the yaw bearing arrangement 6, showing the yaw ring 7 and the housing 11 respectively the ring 12. It also shows two axial bores 13, between which axial bores 13 a radial bore 16 is provided. This radial bore 16 comprises a first threaded bore section 17 having a larger diameter than a second unthreaded bore section 18, which ends adjacent to the lateral inner radial surface 19 the yaw ring 7. The radial bore 16 accommodates a radial sliding unit 14 used for the radial adjustment of the yaw ring 7, comprising an adjustment bolt 20 with a threaded section 21 and an unthreaded section 22 with a smaller diameter. At the free end a tool attachment 23 is provided for screwing the adjustment bolt into the bore 16.

Furthermore, the radial sliding unit 14 comprises a sliding pad 24 which is arranged in the unthreaded section 18 of the bore 16. As FIG. 3 shows, the unthreaded bolt section 22 engages the unthreaded bore section 18 and contacts the sliding pad 24. By screwing the adjustment bolt 20 into the bore 16 the position of the sliding pad 21, which contacts the inner lateral surface 19 of the yaw ring 7, can be changed. As a plurality of these separate sliding units 14 is provided, see FIG. 2, it is possible to precisely adjust the radial position of the yaw ring 7 even when strong varying loads rest on the yaw bearing arrangement 6.

Figure 4:
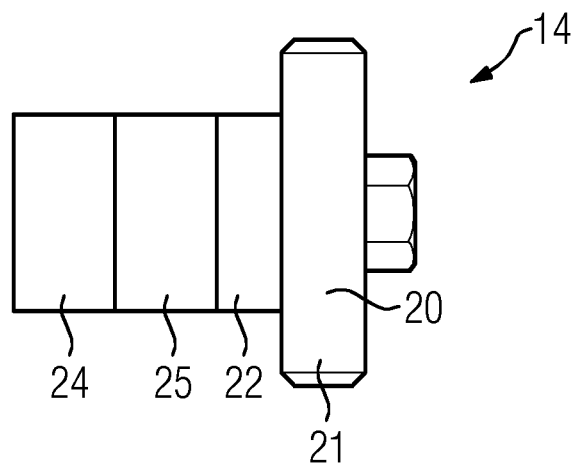
FIG. 4 shows a principal view of a second adjustment unit.
Figure 5:
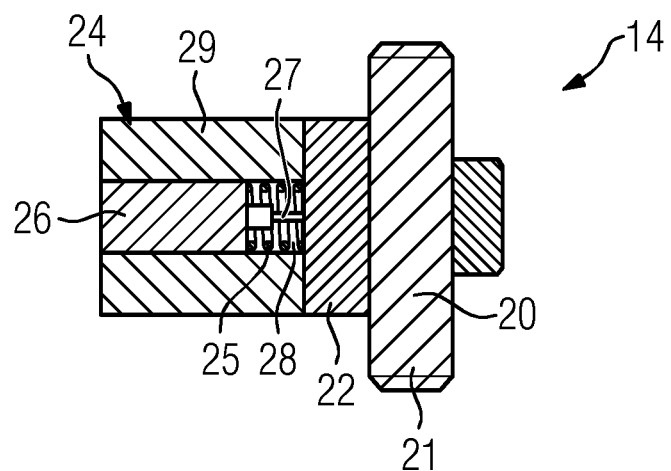
FIG. 5 shows a principal view of a third adjustment unit.
Figure 6:
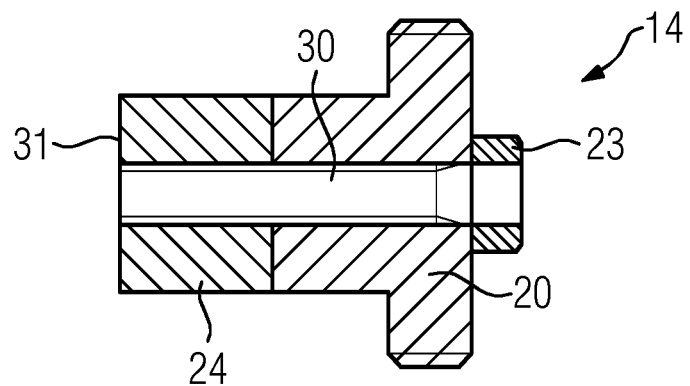
FIG. 6 shows a principal view of fourth adjustment unit.

The FIGS. 4 to 6 show various other embodiments of a radial sliding unit 14, which can be inserted into the respective bore 16.

The radial sliding unit 14 of FIG. 4 also comprises an adjustment bolt 20 with a threaded section 21 having a larger diameter and an unthreaded section 22 having a smaller diameter. It also comprises a sliding pad 24 for contacting the inner lateral surface 19 of the yaw ring 7. In this embodiment an elastic biasing means or biasing member 25 having a plate- or ring-shape is inserted between the sliding pad 24 and the bolt 20. As each of the sliding units 14 comprises such an elastic biasing means or biasing member 25, which biases the sliding pad 24 against the lateral inner surface 19, but which is also used as a damping means or damper for absorbing high load peaks resting on the yaw bearing arrangement due to varying environmental conditions like strongly varying wings etc., a constant contact of all sliding pads 24 to the inner surface 19 is maintained and a damping of loads is possible at all positions.

This sliding unit 14 can easily be arranged in the respective radial bore 16 by simply inserting the sliding pad 24 and the biasing means or biasing member 25 into the unthreaded section 18 of the bore 16 and screwing the bolt 20 into the threaded section 17.

FIG. 5 shows another embodiment of a radial sliding unit 14. Also, this adjustment unit 14 comprises a bolt 20 with a threaded section 21 and an unthreaded section 22. It also comprises a sliding pad 24 with a sliding part 29, which is here ring-shaped and which rests directly on the bolt 20. The sliding pad 24 comprises a lightning part 26, which also contacts the inner lateral surface of the yaw ring 7. The lightning part 26 is electrically connected via a cable 27 or the like to the bolt 20. As the bolt 20 is electrically connected to the metal housing 11 which is grounded a secure lightning arrangement is provided.

Furthermore, a hollow spring compartment 28 is provided in the sliding pad 24, in which the biasing means or biasing member 25 in form of a spring is arranged. This spring acts on the lightning part 26, which is firmly connected to the sliding part 29 of the sliding pad 24. The sliding part 29 is made of a polymer, while the lightning part 26 part is made of metal. It is to be noted that certainly also the sliding pad 24 of the embodiments according to FIGS. 3 and 4 are made of a sliding polymer.

FIG. 6 shows a sliding unit 14 comparable to the one shown in FIG. 3. It comprises a bolt 20 and a sliding pad 24. Additionally, a lubrication bore 30 is provided which extends through the bolt 20 and the sliding pad 24 and ends at the sliding surface 31 of the sliding pad 24 respectively at the free end of the bolt 20 respectively the tool attachment 23. A lubrication means or lubricator like a lubrication pump or the like can be connected to the lubrication bore 30 for pressing a lubrication fluid through the lubrication bore 30 into the contact area of the sliding pad 24 and the lateral inner surface 19 of the yaw ring 7. In an alternative it is possible to insert a tubing connected to the sliding pad into the lubrication bore 30 for providing a lubrication means into the contact area. It is to be noted that all previously described embodiments may certainly also comprise such a lubrication bore 30.

Figure 7:
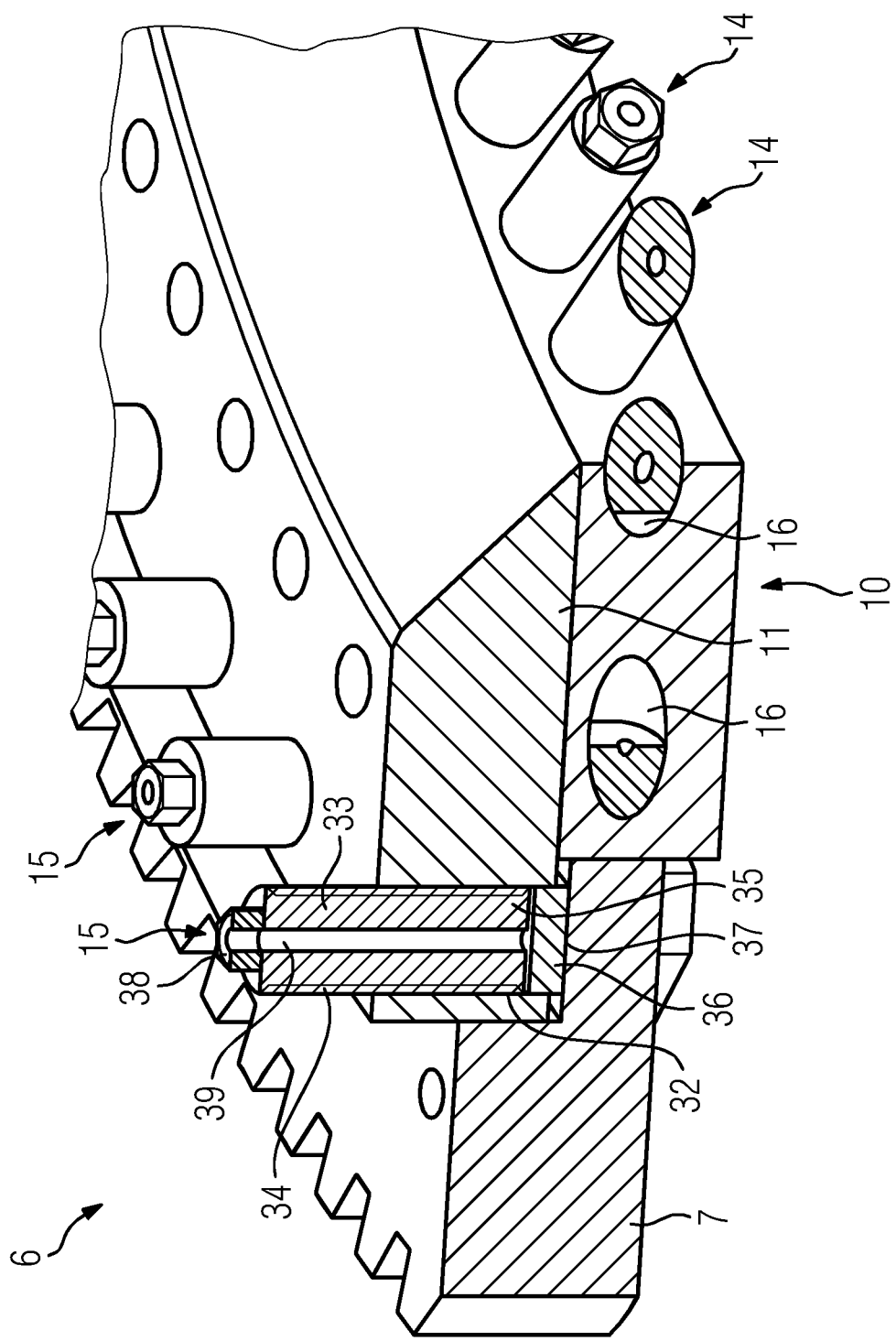
FIG. 7 shows a cross sectional view of a part of the yaw bearing arrangement of FIG. 1 with an axial sliding unit.

Finally, FIG. 7 shows a partial view of the yaw bearing arrangement 6, with the yaw ring 7 and the adjustment means 10 with the housing 11. It also shows some radial sliding units 14 partially cut due to the cross section and the respective radial bores 16 into which they are inserted.

FIG. 7 also shows the axial sliding means 15, one of them in a cross-sectional view.

The housing 11 comprises a plurality of axial threaded bores 32, into which the respective axial sliding means 15 are inserted. Each sliding means 15 comprises a at least partially threaded bolt 33 comprising a threaded section 34 and, optionally, an unthreaded section 35. Each sliding unit 15 further comprises a sliding pad 36 resting on the axial adjustment bolt 33. This sliding pad 36 is positioned by means of the axial adjustment bolt 33 relative to an axial surface 37 of the yaw ring 7, which is held in place by the plurality of the sliding pads 36 and which can rotate relative to the sliding pad 36.

FIG. 7 shows the bolt 33 also comprises a tool attachment 38, so that a tool can easily be attached to the bolt 33 for screwing it.

Furthermore, a lubrication bore 39 is provided, ending with one end at the free end of the bolt 33, here at the tool attachment 38, and extending through the bolt 33 and the sliding pad 36. A lubrication means or lubricator can be connected to the lubrication bore 39 for pressing a lubrication fluid through the lubrication bore 39 in the contact area of the sliding pad 36 and the surface 37, while also here a tubing can be inserted in the lubrication bore 39 connected to the sliding pad respectively the sliding area.

FIG. 7 shows a threaded bore 32 and an axial bolt 33, both having a constant diameter. It is to be noted that it is certainly possible to also have a stepped bore 32 and a stepped bolt 33, having respective different sections with different diameters, as is shown for example in FIG. 3 for the radial bore 16 and the radial sliding unit 14.

Furthermore, the axial sliding units 15 may also comprise respective biasing or damping means or damper, as certainly also a lightning part maybe provided. Therefore, all details explained to the radial sliding unit 14 also refer to the axial sliding unit 15.

While especially FIG. 2 refers to a ring 12 making the housing 11, it is to be noted that all details explained above also refer to the embodiment with several radial adjustment means or radial adjustment 10 comprising a housing 11 in the form of separate ring segments, which are equally distributed around the inner circumference of the yaw ring 7. These ring segments may connect each other building a ring, or they may be separate from each other by a certain angular displacement. The ring or the ring segments may be separate parts, but they can also be integral with the bedframe of the nacelle, either by being cast with or machined out of the bedframe. However, the set-up is, each ring segment comprises a plurality of at least the radial adjustment means or radial adjustment 10 respectively radial sliding units 14, and, if need be, also a plurality of the axial adjustment means respectively the axial sliding units 15. It is to be noted that, also referring to the embodiments of FIGS. 2-7, the axial adjustment means respectively the axial sliding units 15 are only optional, they may be provided, but embodiments of the invention also cover embodiments where no axial adjustment means respectively axial sliding units 15 are provided.

Although the present invention has been described in detail with reference to the preferred embodiment, the present invention is not limited by the disclosed examples from which the skilled person is able to derive other variations without departing from the scope of the invention.

For the sake of clarity, it is to be understood that the use of "a" or "an" throughout this application does not exclude a plurality, and "comprising" does not exclude other steps or elements.

The invention claimed is:

1. A yaw bearing arrangement for a wind turbine, comprising:
a yaw ring that includes an inner lateral surface; and
a radial adjustment which acts upon the inner lateral surface and which comprises
a housing including a ring or ring segment with a plurality of radial bores that are at least partially threaded, that each accommodate a radial sliding unit and that each include a first threaded bore section having a first diameter and a second unthreaded bore section having a second diameter smaller than the first diameter,
at least one radial sliding unit accommodated by one of the plurality of radial bores, the radial sliding unit including
a sliding pad which is accommodated by the second diameter of the second unthreaded bore section of the one of the plurality of radial bores, and
an adjustment bolt arranged in threaded engagement with the one of the plurality of radial bores and connected with the sliding pad for a radial adjustment of the sliding pad towards the inner lateral surface, the adjustment bolt comprising a first threaded bolt section and a second unthreaded bolt section engaging into the second unthreaded bore section, and a plurality of axial bores for accommodating fixation bolts.

2. The yaw bearing arrangement according to claim 1, wherein the ring or the ring segment of the housing comprises a plurality of axial threaded bores, each axial threaded bore accommodating an axial sliding unit comprising an axial sliding pad and an at least partially threaded axial adjustment bolt for axial movement of the axial sliding pad.

3. The yaw bearing arrangement according to claim 2, wherein each axial threaded bore has a first threaded bore section having a first diameter and a second unthreaded bore section, having a second diameter smaller than the first diameter, accommodating the axial sliding pad.

4. The yaw bearing arrangement according to claim 3, wherein the at least partially threaded axial adjustment bolt comprises a first threaded bolt section and a second unthreaded bolt section engaging into the second unthreaded bore section of the axial threaded bore.

5. The yaw bearing arrangement according to claim 1, further comprising a biasing member for biasing the sliding pad towards the inner lateral surface.

6. The yaw bearing arrangement according to claim 5, wherein the biasing member comprises a spring resting on the adjustment bolt and the sliding pad, or the biasing member comprises an elastic intermediate pad or ring arranged between the adjustment bolt and the sliding pad.

7. The yaw bearing arrangement according to claim 6, wherein the biasing member comprises the spring and the spring is arranged in a hollow spring compartment disposed at the sliding pad.

8. The yaw bearing arrangement according to claim 1, wherein the sliding pad comprises a sliding part made of polymer material and a lightning part made of metal, with the lightning part being electrically connected to the adjustment bolt.

9. The yaw bearing arrangement according to claim 8, wherein the sliding part comprises a ring-shaped sliding part and the lightning part is arranged in the ring-shaped sliding part.

10. The yaw bearing arrangement according to claim 1, further comprising a lubrication bore and wherein the lubrication bore is disposed in the adjustment bolt and the sliding pad and ending at the sliding surface of the sliding pad.

11. A wind turbine comprising at least one yaw bearing arrangement according to claim 1.

12. A yaw bearing arrangement for a wind turbine, comprising:
a yaw ring that includes an inner lateral surface; and
a radial adjustment which acts upon the inner lateral surface and which comprises
a housing including a ring or ring segment with a plurality of radial bores that are at least partially threaded, and that each accommodate a radial sliding unit,
at least one radial sliding unit accommodated by one of the plurality of radial bores, the radial sliding unit including
a sliding pad which is accommodated by the second diameter of the second unthreaded bore section of the one of the plurality of radial bores,
an adjustment bolt arranged in threaded engagement with the one of the plurality of radial bores and connected with the sliding pad for a radial adjustment of the sliding pad towards the inner lateral surface, and
a biasing member for biasing the sliding pad towards the inner lateral surface, and wherein the biasing member comprises a spring resting on the adjustment bolt and the sliding pad and the spring is arranged in a hollow spring compartment disposed at the sliding pad, and
a plurality of axial bores for accommodating fixation bolts.

13. A yaw bearing arrangement for a wind turbine, comprising:
a yaw ring that includes an inner lateral surface; and
a radial adjustment which acts upon the inner lateral surface and which comprises
a housing including a ring or ring segment with a plurality of radial bores that are at least partially threaded, and that each accommodate a radial sliding unit,
at least one radial sliding unit accommodated by one of the plurality of radial bores, the radial sliding unit including
a sliding pad which is accommodated by the second diameter of the second unthreaded bore section of the one of the plurality of radial bores and which comprises a sliding part made of polymer material and a lightning part made of metal,
an adjustment bolt which is arranged in threaded engagement with the one of the plurality of radial bores, which is connected with the sliding pad for a radial adjustment of the sliding pad towards the inner lateral surface and which is electrically connected to the lightning part of the sliding pad, and
a plurality of axial bores for accommodating fixation bolts.

14. A yaw bearing arrangement for a wind turbine, comprising:
a yaw ring that includes an inner lateral surface; and a radial adjustment which acts upon the inner lateral surface and which comprises
- a housing including a ring or ring segment with a plurality of radial bores that are at least partially threaded, and that each accommodate a radial sliding unit,
- at least one radial sliding unit accommodated by one of the plurality of radial bores, the radial sliding unit including
  - a sliding pad which is accommodated by the second diameter of the second unthreaded bore section of the one of the plurality of radial bores,
  - an adjustment bolt arranged in threaded engagement with the one of the plurality of radial bores and connected with the sliding pad for a radial adjustment of the sliding pad towards the inner lateral surface, and
  - a lubrication bore disposed in the adjustment bolt and the sliding pad and ending at a sliding surface of the sliding pad, and
- a plurality of axial bores for accommodating fixation bolts.

\* \* \* \* \*